United States Patent
Hodroj et al.

(10) Patent No.: US 11,671,865 B2
(45) Date of Patent: *Jun. 6, 2023

(54) MESH NETWORK AUGMENTATION OF CELLULAR CONNECTIONS

(71) Applicant: T-Mobile USA, Inc., Bellevue, WA (US)

(72) Inventors: Samir M. Hodroj, Bothell, WA (US); Cameron Byrne, Seattle, WA (US); David Jones, Bellevue, WA (US); Ahmad Armand, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,494

(22) Filed: Oct. 25, 2021

(65) Prior Publication Data

US 2022/0116813 A1   Apr. 14, 2022

Related U.S. Application Data

(63) Continuation of application No. 16/548,561, filed on Aug. 22, 2019, now Pat. No. 11,159,975.

(51) Int. Cl.
*H04W 28/02* (2009.01)
*H04W 28/20* (2009.01)
*H04W 28/12* (2009.01)
*H04W 84/18* (2009.01)

(52) U.S. Cl.
CPC ... *H04W 28/0247* (2013.01); *H04W 28/0236* (2013.01); *H04W 28/12* (2013.01); *H04W 28/20* (2013.01); *H04W 84/18* (2013.01)

(58) Field of Classification Search
CPC ......... H04W 28/0247; H04W 28/0236; H04W 28/12; H04W 28/20; H04W 84/18
USPC .......................................................... 370/235
See application file for complete search history.

(56) References Cited

U.S. PATENT DOCUMENTS

| | | |
|---|---|---|
| 2013/0176934 A1 | 7/2013 | Malladi et al. |
| 2014/0185497 A1 | 7/2014 | Wolf et al. |
| 2017/0181197 A1 | 6/2017 | Aguirre et al. |
| 2018/0316617 A1 | 11/2018 | Lubenski et al. |
| 2019/0239100 A1 | 8/2019 | Pandey et al. |
| 2020/0145836 A1 | 5/2020 | Smith |
| 2021/0058815 A1 | 2/2021 | Hodroj |

OTHER PUBLICATIONS

Office Action for U.S. Appl. No. 16/548,561, dated Mar. 12, 2021, Hodroj, "Mesh Network Augmentation of Cellular Connections", 11 pages.

(Continued)

*Primary Examiner* — Gbemileke J Onamuti
(74) *Attorney, Agent, or Firm* — Lee & Hayes, P.C.

(57) ABSTRACT

Techniques for monitoring and configuring a mesh network are discussed herein. A centralized database may receive, from one or more access points that make up the mesh network, conditions data associated with the access points and the backhaul links between the access points. The centralized database may determine a radio frequency (RF) resource that should be used for the backhaul links to optimize the mesh network and send an instruction to the access point to operate using the RF resource.

21 Claims, 7 Drawing Sheets

(56) References Cited

OTHER PUBLICATIONS

Office Action for U.S. Appl. No. 16/548,561, dated Jul. 20, 2020, Hodroj, "Mesh Network Augmentation of Cellular Connections", 15 Pages.
Office Action for U.S. Appl. No. 16/548,561, dated Nov. 30, 2020, Hodroj, "Mesh Network Augmentation of Cellular Connections", 17 Pages.
"U.S. Appl. No. 62/756,864, filed Nov. 7, 2018 for U.S. Appl. No. 16/676,263", 10 pgs.

MESH NETWORK AUGMENTATION OF CELLULAR CONNECTIONS

RELATED APPLICATIONS

This application is a continuation of and claims priority to U.S. patent application Ser. No. 16/548,561, filed Aug. 22, 2019, titled "MESH NETWORK AUGMENTATION OF CELLULAR CONNECTIONS," the entirety of which is incorporated herein by reference.

BACKGROUND

Cellular communication devices use various network radio access technologies to communicate wirelessly with geographically distributed base stations and/or access points. Long-Term Evolution (LTE) is an example of a widely implemented radio access technology, which is used within $4^{th}$-Generation (4G) communication systems. New Radio (NR) is a newer radio access technology that is used in $5^{th}$-Generation (5G) communication systems. Standards for LTE and NR radio access technologies have been developed by the 3rd-Generation Partnership Project (3GPP) for use within cellular communication networks by wireless communication carriers.

Existing 4G networks use relatively low radio frequencies, such as frequencies in bands below 6 GHz. 5G networks are able to use an extended range of frequency bands compared to 4G networks, such as higher frequency bands in in the range of 6-100 GHz. Radio communications using the higher frequency 5G bands can support higher data speeds, but also have disadvantages compared to the lower frequency bands. Specifically, radio signals in the higher frequencies have shorter range and are more easily blocked by physical objects. Accordingly, the ability for a communication device to communicate using higher-frequency 5G bands may be sporadic as the device is physically moved.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
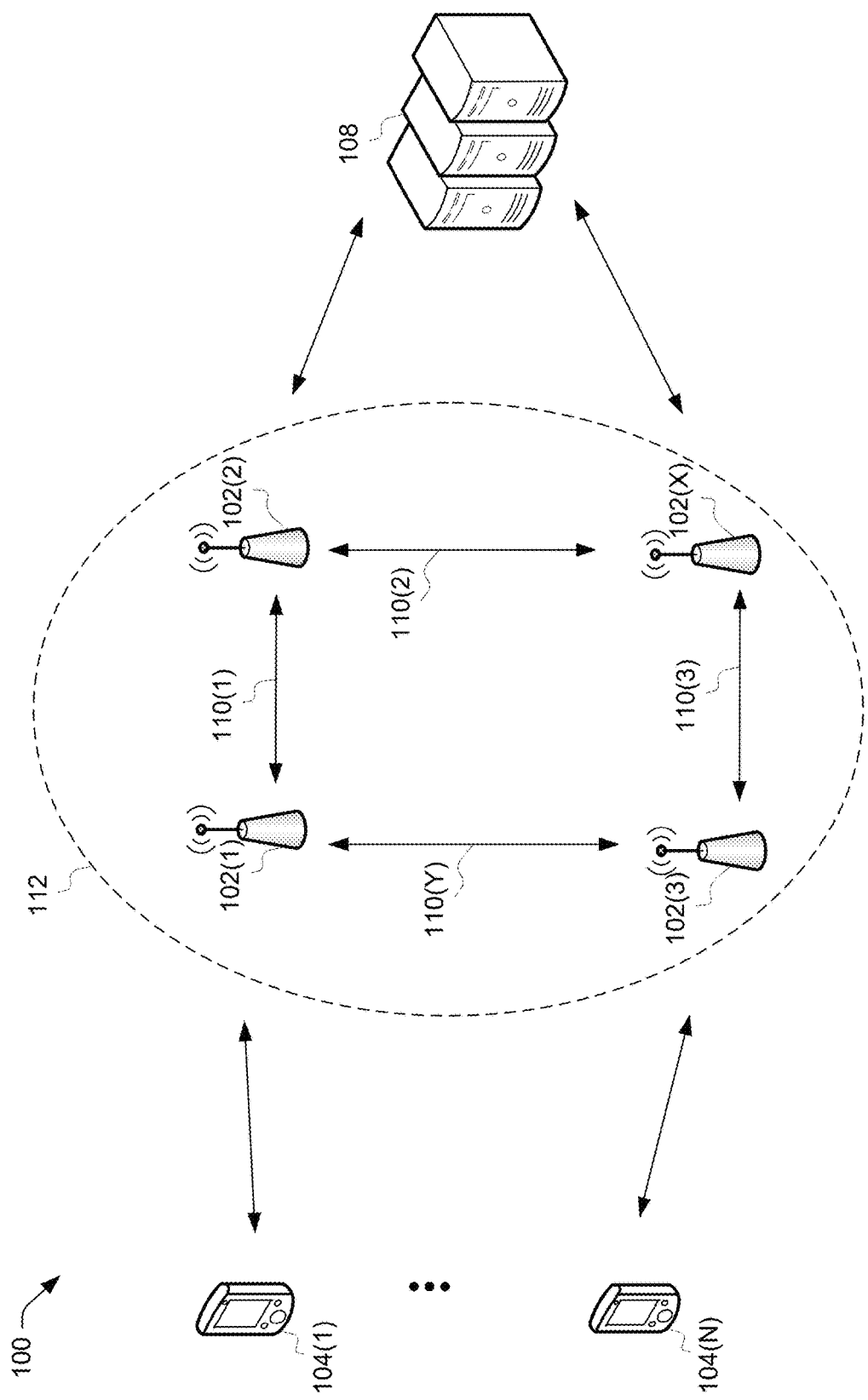
FIG. 1 illustrates an overview and example environment, including a system in which a mesh network may be monitored and configured, in accordance with some examples of the present disclosure.

Techniques for determining radio frequency (RF) resources to utilize in a mesh network in order to optimize the functioning of the mesh network are discussed herein. RF resources may include, for example, licensed bands or unlicensed bands. In some examples, a centralized database may monitor radio links between access points and UEs that are connected to them as well as the links between access points that make up the mesh network and may receive conditions data from the access points in order to determine the RF resources that should be used in order to optimize the mesh network. Conditions data may include, for example, signal level, signal quality, or packet loss.

As the use and functionality of user equipment (UE) increases, so does the overall bandwidth demands in a communications network. Additionally, with mm-wave RF deployments, which may be used in some 5G communication systems, signal propagation is effective over shorter and shorter distances, which may lead to holes in wireless coverage. A plurality of access points may be located throughout an environment to address these increased bandwidth demands and/or "holes" in coverage by providing line-of-sight signals to an environment. Each access point within a mesh network may communicate with one another and/or a core network via backhaul links, which may comprise wired or wireless connections. These backhaul links may be monitored by a centralized database described herein and be used to determine a type of RF resource which each access point should utilize in order to optimize the mesh network, thereby providing better network coverage to the UE and reducing strain on the network.

In particular, a centralized database may be stored at a telecommunications device, such as a core network server or a base station. The centralized database may monitor the links between the access points and the UEs connected to them as well as the links used to communicate between the access points that make up a mesh network. In some cases, the access points may store an agent that reports conditions data to the centralized database. For example, the agent stored at an access point may monitor conditions data, such as weather data, signal level, a signal quality, a packet loss rate, interference, an uplink rate, or a downlink rate, and report the conditions data to the centralized database. In some cases, the conditions data may include a location of the access point or nearby access points such that the centralized database may determine a distance between access points. For example, two access points having a greater distance between one another may require a RF with a lower frequency and further range in order to communicate than two access points that are closer in distance that may communicate using a RF with a greater frequency and shorter range. Once the centralized database has received the conditions data, a machine learning algorithm may be utilized to determine a RF resource to be utilized for an individual access point or a group of access points that make up the mesh network. In some cases, the RF resources may be determined based on a determined potential throughput calculated based on the conditions data.

In some cases, the RF resources may include licensed or unlicensed spectrum or a combination of licensed and unlicensed. For example, unlicensed spectrum may include a number of unlicensed RF bands, such as Wi-Fi, Bluetooth, etc., each of which may have different characteristics that may affect the mesh network in a different way. Similarly, licensed spectrum may include a number of licensed RF bands, such as RF signals according to 3rd Generation Partnership Project (3GPP) protocols, Universal Mobile Telecommunications System (UMTS) protocols, Long Term Evolution (LTE) protocols, Fifth Generation (5G) protocols, etc., that each include different characteristics that affect the mesh network in a different way. Each access point in the mesh network may support both licensed RF bands and unlicensed RF bands and each access point may be configured to receive an instruction from the centralized database to utilize a specific RF band based on the conditions data that was provided to the centralized database. In some cases, different access points may receive instructions to operate on different bands such that the mesh network utilizes both licensed and unlicensed spectrum as well as different bands within each of the licensed and unlicensed spectrum.

The systems, devices, and techniques described herein can improve a functioning of a network by optimizing communications in a mesh network to improve bandwidth, reduce interference, and the like, to provide wireless resources to various UEs. For example, the systems, devices, and techniques can determine weather data, distances between access points, UE distributions, communication protocols beings used by access points, and the like, in order to determine if these factors are causing or are otherwise affected by interference between the access points that make up the mesh network. The systems, devices, and techniques discussed herein provide a distributed framework for network analysis, which provides the ability to modify individual access points and their associated communication links automatically and remotely. Moreover, by constantly monitoring the network and modifying the access points and their associated communication links, the network may automatically and remotely send commands to the access points to adjust (e.g., increase or decrease) transmission power or protocols, for example. These and other improvements to the functioning of a computer and network are discussed herein.

The systems, devices, and techniques described herein can be implemented in a number of ways. Example implementations are provided below with reference to the following figures.

FIG. 1 schematically illustrates an example wireless communication network 100 (also referred to herein as network 100). The network 100 comprises one or more access points 102(1), 102(2), 102(3), and 102(X) (referred to herein as access points 102) that may be communicatively coupled to a plurality of user equipment (UE), e.g., UE 104(1) and/or 104(N) (referred to herein as UE 104). Each access point 102 may communicate with a core network 108 of the wireless communication network 100.

In a configuration, the UE 104 may comprise any appropriate device, e.g., a stationary device or a portable electronic device, for communicating over a wireless communication network. Such devices include mobile telephones, cellular telephones, internet protocol (IP) telephones, mobile computers, Personal Digital Assistants (PDAs), radio frequency devices, handheld computers, laptop computers, tablet computers, palmtops, pagers, devices configured as IoT devices, IoT sensors that include cameras, integrated devices combining one or more of the preceding devices, and/or the like. As such, UE 104 may range widely in terms of capabilities and features. For example, in a configuration, the UE 104 may have a numeric keypad, a capability to display only a few lines of text and be configured to interoperate with only Global System for Mobile Communications (GSM) networks. However, in another configuration, the UE 104 (e.g., a smart phone) may have a touch-sensitive screen, a stylus, an embedded Global Positioning System (GPS) receiver, and a relatively high-resolution display, and be configured to interoperate with multiple types of networks. The UE 104 may also comprise a SIM-less device (i.e., a UE that does not contain a functional subscriber identity module ("SIM")), a roaming UE (i.e., a UE operating outside of their home access network), and/or mobile software applications.

In a configuration, the access points 102 may communicate voice traffic and/or data traffic with one or more UEs 104 using RF signals. The access points 102 may communicate with the UE 104 using one or more appropriate wireless communication protocols or standards. For example, the access points 102 may communicate with the UE 104 using one or more standards, including but not limited to GSM, Time Division Multiple Access (TDMA), Universal Mobile Telecommunications System (UMTS), Evolution-Data Optimized (EVDO), Long Term Evolution (LTE), Fifth Generation (5G), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi protocols (including IEEE 802.11 protocols), WiMAX protocols (including IEEE 802.16e-2005 and IEEE 802.16m protocols), High Speed Packet Access (HSPA) (including High Speed Downlink Packet Access (HSDPA) and High Speed Uplink Packet Access (HSUPA)), Ultra Mobile Broadband (UMB), and/or the like.

In configurations, the core network 108 may support packet-switched or circuit-switched connections and may include a number of network components. Such components may include a home location register (HLR) or HSS for storing user and device information, as well as IMS components, such as the P-CSCF and S-CSCF. The components may also include an application server(s), such as a telephony application server (TAS) or rich communication service (RCS) server. Further, the core network 108 may include an account information server (AIS), which may provide network identities, contact addresses, credentials, and other information to the UEs 104.

In addition to or instead of the configuration above, in some examples the core network 108 may include 4G core network comprising a Mobility Management Entity (MME), a Serving Gateway (SGW), a Packet Data Network (PDN) Gateway (PGW), a Home Subscriber Server (HSS), an Access Network Discovery and Selection Function (ANDSF), an evolved Packet Data Gateway (ePDG), a Data Network (DN), and the like.

In addition to or instead of the configuration above, in some examples the core network 108 can include a 5G core network comprising any of an Access and Mobility Management Function (AMF), a Session Management Function (SMF), a Policy Control Function (PCF), an Application Function (AF), an Authentication Server Function (AUSF), a Network Slice Selection Function (NSSF), a Unified Data Management (UDM), a Network Exposure Function (NEF), a Network Repository Function (NRF), a User Plane Function (UPF), a data network (DN), and the like.

In addition, the core network 108 may be implemented on a single computing device. Such computing devices may each be or include a server or server farm, multiple, distributed server farms, a mainframe, a work station, a PC, a laptop computer, a tablet computer, an embedded system, or any other sort of device or devices. In one implementation, the computing device(s) represent a plurality of computing devices working in communication, such as a cloud-computing network of nodes.

In configurations, the core network 108 may include a centralized database that may monitor links 110(1), 110(2), 110(3), 110(Y) used to communicate between the access points 102 that make up a mesh network 112. In some examples, the links 110(1)-110(Y) include communication channels. In some cases, the access points 102 may store an agent that reports conditions data to the centralized database stored at the core network 108. For example, the agent stored at the access point 102 may monitor conditions data, such as weather data (e.g., temperature, humidity, indications of rain, etc.), signal level and/or a signal quality (e.g., SINR/SNR, RSRP, RSRQ, RSSI, etc.), a packet loss rate, interference, an uplink rate, or a downlink rate, load information, and the like, and may report the conditions data to the centralized database at the core network 108. In some cases, the conditions data may include a location of the access point 102 or nearby access points 102(1)-102(X) such that the centralized database at the core network 108 may determine a distance between access points 102. For example, access points 102(1) and 102(3) may have a greater distance between one another and may use a RF with a lower frequency and further range in order to communicate via the link 110(Y) than access points 102(1) and 102(2) that are closer in distance and may communicate using a RF with a greater frequency and shorter range via link 110(1).

In some cases, the centralized database may receive conditions data from a third-party other than the access points 102. For example, the centralized database may receive environmental conditions from a third-party, such as a weather service. In some cases, the conditions data may include self-organized network (SON) data collected by the access points 102. In some examples, the centralized database may receive connection information indicating frequency resources and/or protocols being used by access points 102 of the mesh network 112 at various instants of time. Once the centralized database has received the conditions data and/or connection information, a machine learning algorithm may be utilized to determine a potential throughput for the mesh network 112 and/or an individual access point 102 if a RF resource is utilized for an individual access point 102 or a group of access points 102(1)-102(X) that make up the mesh network 112. For example, the RF resource may be determined based on a determined potential throughput calculated based on the conditions data.

In some examples, the machine learning algorithm may include multiple models that may be updated based on historical data. The machine learning algorithm may include heuristics, IF-THEN statements, and the like. In some examples, a machine learning algorithm can include, but is not limited to, one or more of: neural network(s), convolutional neural network(s), recurrent neural network(s), linear regression algorithm(s), logistic regression algorithm(s), classification and regression tree algorithm(s), Naïve Bayes algorithm(s), K-nearest neighbors algorithm(s), learning vector quantization algorithm(s), support vector machine(s), bagging and random forest algorithm(s), boosting and Adaboost algorithm(s), and the like.

In some examples, the access node 102(1) of the mesh network 112 may operate using a first protocol to communicate. The centralized database may receive data, such as conditions data, connection information, weather condition data, and/or load information, from any or all of the access nodes 102(1)-102(X) that make up the mesh network 112 and/or a third party. The machine learning algorithm stored at the centralized database may determine if, based on the received data, whether the links 110(1)-110(Y) should be modified to increase robustness (e.g., if weather is causing interference, if two close access points are using the same resources and causing interference, and the like), increase bandwidth (e.g., based on load), etc. In some examples, the machine learning algorithm may be configured to consider other factors when determining if the links 110(1)-110(Y) should be modified, such as a distance between the access points 102(1)-102(X), a type of traffic being utilized via access points 102(1)-102(X), a determined bandwidth being utilized via the access points 102(1)-102(X), etc.

In some cases, the RF resource may include licensed spectrum or unlicensed spectrum. For example, unlicensed spectrum may include a number of unlicensed RF bands, such as Wi-Fi, Bluetooth, etc., each of which may have different characteristics that may affect the mesh network in a different way. Similarly, licensed spectrum may include a number of licensed RF bands, such as RF signals according to 3rd Generation Partnership Project (3GPP) protocols, Universal Mobile Telecommunications System (UMTS) protocols, Long Term Evolution (LTE) protocols, Fifth Generation (5G) protocols, etc., that each include different characteristics that affect the mesh network 112 in a different way. In some cases, the centralized database may determine that different access points 102 should receive instructions to operate on different bands such that the mesh network 112 utilizes both licensed and unlicensed spectrum as well as different bands within each of the licensed and unlicensed spectrum. Each access points 102(1)-102(X) in the mesh network 112 may support both licensed RF bands and unlicensed RF bands and each access point 102(1)-102(X) may be configured to receive an instruction from the centralized database of the core network 108 to utilize a specific RF resource (e.g., a specific RF band) based on the conditions data that was provided to the centralized database of the core network 108. The RF resource may be any of, or any combination of, single unlicensed carrier, multiple aggregated unlicensed carriers, single licensed carrier, or multiple aggregated licensed carriers.

Figure 2:
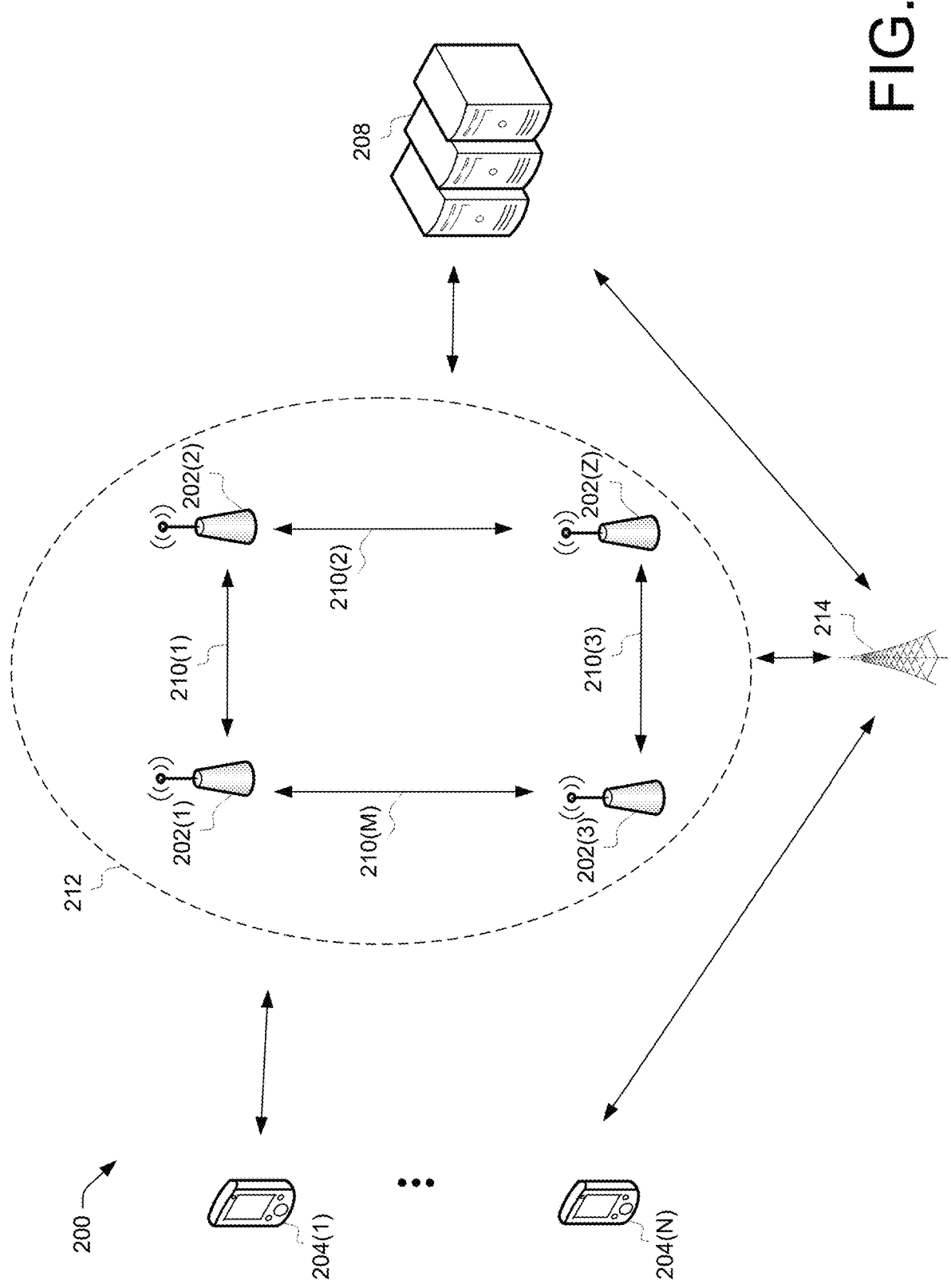
FIG. 2 illustrates an overview and another example environment, including a system in which a mesh network may be monitored and configured, in accordance with some examples of the present disclosure.

FIG. 2 schematically illustrates an example wireless communication network 200 (also referend to herein as network 200). The network 200 comprises one or more access points 202(1), 202(2), 202(3), and 202(Z) (referred to herein as access points 202) that may be communicatively coupled to a plurality of user equipment (UE), e.g., UE 204(1) and/or 204(N) (referred to herein as UE 204). Each access point 202 may communicate with a core network 208 of the wireless communication network 200. The access points 202 may communicate with one another via links 210(1), 210(2), 210(3), and 210(M) which form a mesh network 212. In FIG. 2, the network 200 may also include a base station 214 that may be used to communicate with the UEs 204, the mesh network 212, and/or the core network 208. In some examples, the base station 214 may store a centralized database configured to modify the links 210(1)-210(M) in order to optimize the performance of the mesh network 212. In some examples, the base station 214 may be part of the mesh network 212 and/or operate as an access point within the mesh network 212. In this way, the access points 202-202(Z) do not need to report conditions data to the core network 208, but rather, report conditions data to a device (e.g., base station 214) within the mesh network 212.

In configurations, the base station 214 may be associated with any one of a macrocell, microcell, a picocell, or a femtocell for providing radio access to the UEs 204. One example macrocell is a node in an evolved UMTS Terrestrial Radio Access Network (E-UTRAN) of an LTE system. The E-UTRAN includes an evolved NodeB (eNodeB or eNB). In one example, an eNB functions similarly to a base transceiver station in a GSM network. The E-UTRAN facilitates communication between the UEs 204 and the core network 208. In an example, an eNB is connected to the core network 208 and communicates directly with UEs 204. In some examples, the macrocell may include a gNodeB of a Fifth Generation (5G) cellular network.

In configurations, the base station 214 may include a centralized database that may monitor links 210(1), 210(2), 210(3), 210(M) used to communicate between the access points 202 that make up the mesh network 212. In some cases, the access points 202 may store an agent that reports conditions data to the centralized database stored at the base station 214. For example, the agent stored at the access point 202 may monitor conditions data, such as weather data (e.g., temperature, humidity, indications of rain, etc.), signal level and/or a signal quality (e.g., SINR/SNR, RSRP, RSRQ, RSSI, etc.), a packet loss rate, interference, an uplink rate, or a downlink rate, load information, and the like, and may report the conditions data to the centralized database at the base station 214. In some cases, the conditions data may include a location of the access point 202 or nearby access points 202(1)-202(Z) such that the centralized database at the base station 214 may determine a distance between access points 102. For example, access points 202(1) and 202(3) may have a greater distance between one another and may use a RF with a lower frequency and further range in order to communicate via the link 210(M) than access points 202(1) and 202(2) that are closer in distance and may communicate using a RF with a greater frequency and shorter range via link 210(1).

In some cases, the centralized database may receive conditions data from a third-party other than the access points 202. For example, the centralized database may receive environmental conditions from a third-party, such as a weather service. In some cases, the conditions data may include self-organized network (SON) data collected by the access points 202. In some examples, the centralized database may receive connection information indicating frequency resources and/or protocols being used by access points 202 of the mesh network 212 at various instants of time. Once the centralized database of the base station 214 has received the conditions data and/or connection information, a machine learning algorithm may be utilized to determine a RF resource to be utilized for an individual access point 202 or a group of access points 202(1)-202(Z) that make up the mesh network 212. In some cases, the RF resource may be determined based on a determined potential throughput calculated based on the conditions data. In some cases, the RF resource may include licensed or unlicensed spectrum. For example, unlicensed spectrum may include a number of unlicensed RF bands, such as Wi-Fi, Bluetooth, etc., each of which may have different characteristics that may affect the mesh network in a different way.

Similarly, licensed spectrum may include a number of licensed RF bands, such as RF signals according to 3rd Generation Partnership Project (3GPP) protocols, Universal Mobile Telecommunications System (UMTS) protocols, Long Term Evolution (LTE) protocols, Fifth Generation (5G) protocols, etc., that each include different characteristics that affect the mesh network 212 in a different way. Each access point 202(1)-202(Z) in the mesh network 212 may support both licensed RF bands and unlicensed RF bands and each access point 202(1)-202(Z) may be configured to receive an instruction from the centralized database of the base station 214 to utilize a specific RF band, or a combination of RF bands, based on the conditions data that was provided to the centralized database of the base station 214.

In some cases, the centralized database may determine that different access points 202 should receive instructions to operate on different bands such that the mesh network 212 utilizes both licensed and unlicensed spectrum as well as different bands within each of the licensed and unlicensed spectrum. The network 200 may include any of the devices and communication protocols discussed above with regard to network 100.

Figure 3:
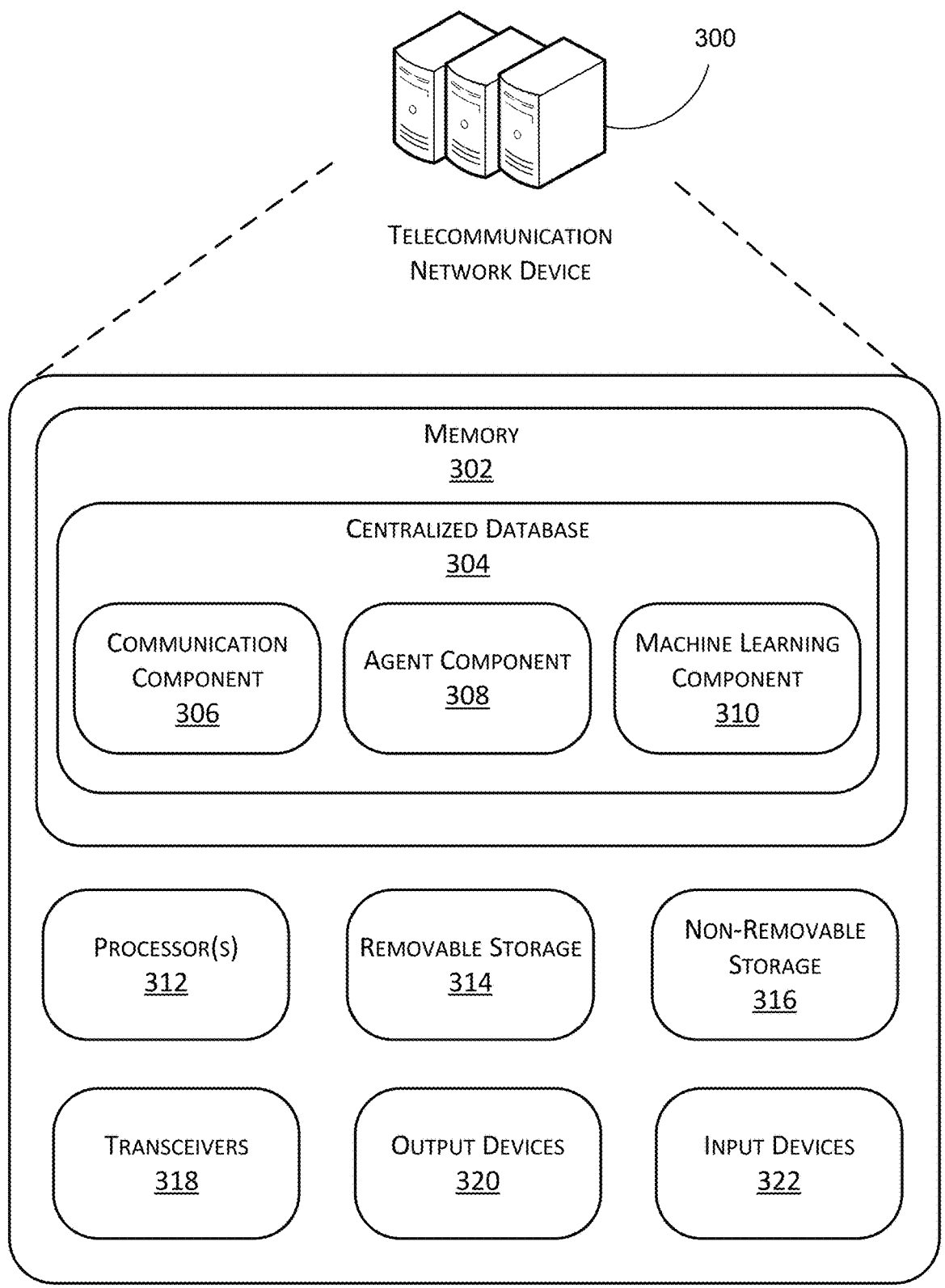
FIG. 3 illustrates a component level view of a telecommunication network device to configure a mesh network, in accordance with some examples of the present disclosure.

FIG. 3 illustrates a component level view of an example telecommunication network device 300 that may be used to monitor and optimize a mesh network, such as mesh network 112 or mesh network 212, among other things. The telecommunication network device 300 may be an example of the core network 108, the base station 214, another network device, or a combination thereof. As illustrated, the telecommunication network device 300 comprises a system memory 302 storing a centralized database 304, a communication component 306, an agent component 308, and a machine learning component 310. Also, the telecommunication network device 300 can include a processor(s) 312, a removable storage 314, a non-removable storage 316, transceivers 318, output device(s) 320, and input device(s) 322.

In various implementations, system memory 302 is volatile (such as RAM), non-volatile (such as ROM, flash memory, etc.), or some combination of the two. The communication component 306 may communicate with any of the access points 102, access points 202, and/or the base station 214 in order to receive conditions data related to the mesh network 112 and/or mesh network 212. The conditions data may include any type of information related to the network 100 and/or network 200. For example, the conditions data may include weather data, signal level, a signal quality, a packet loss rate, interference, an uplink rate, or a downlink rate. In some cases, the conditions data may include a location of the access points 102 and/or the access points 202 such that the centralized database 304 may determine a distance between access points 102 or access points 202. In some cases, the conditions data may include a distance that an access point 102 (e.g., access point 102(1) is from another access point 102 (e.g., access point 102(2), 102(3), and/or 102(X)).

The agent component 308 may store the conditions data received via the communication component 306 as well as any identifying information related to the access points 102 and/or the access points 202. For example, the agent component may determine which conditions data was received from which agent stored on access point 102 and/or access point 202 and may associate the conditions data with the identified agent of the access point when the conditions data is stored. In some cases, when the conditions data is received in a transmission, the transmission may also include identifying information associated with the specific access point 102 and/or the access points 202 that sent the transmission.

In some cases, the agent component 308 may receive location information associated with the access points 102 and/or the access points 202 and may store the location information along with the conditions data associated with the individual access points 102 and/or the access points 202. In some cases, the location information may be included in the conditions data and the agent component 308 may determine a distance between the access points based on the location information. In some cases, the access points 102 and/or the access points 202 may provide a distance to a nearest neighboring access point instead of or in addition to the location information.

The machine learning component 310 may utilize the conditions data, the location information, and/or the distance information to determine a RF resource to be utilized for an individual access point 102 and/or 202 or a group of access points 102(1)-102(X) and/or 202(1)-202(Z) that make up the mesh network 112 and the mesh network 212, respectively. In some cases, the RF resource may be determined based on a determined potential throughput calculated based on the conditions data, the location information, and/or the distance information. The machine learning algorithm may include heuristics, IF-THEN statements, Neural Networks, and the like. In some cases, the RF resource may include licensed and/or unlicensed spectrum.

For example, unlicensed spectrum may include a number of unlicensed RF bands, such as Wi-Fi, Bluetooth, etc., each of which may have different characteristics that may affect the mesh network 112 and/or the mesh network 212 in a different way. Similarly, licensed spectrum may include a number of licensed RF bands, such as RF signals according to 3rd Generation Partnership Project (3GPP) protocols, Universal Mobile Telecommunications System (UMTS) protocols, Long Term Evolution (LTE) protocols, Fifth Generation (5G) protocols, etc., that each include different characteristics that affect the mesh network 112 and/or the mesh network 212 in a different way.

In some cases, the machine learning component 310 may determine that different access points 102(1)-102(X) and/or 202(1)-202(Z) should receive instructions to operate on different bands such that the mesh network 112 and 212 utilizes both licensed and unlicensed spectrum as well as different bands within each of the licensed and unlicensed spectrum. Once the machine learning component 310 has determined the RF resource for each access points 102(1)-102(X) and/or 202(1)-202(Z) in the mesh networks 112 and 212 to utilize, the communication component 306 may send a signal to the access points 102(1)-102(X) and/or 202(1)-202(Z) instructing them to communicate using the determined RF resource.

Figure 4:
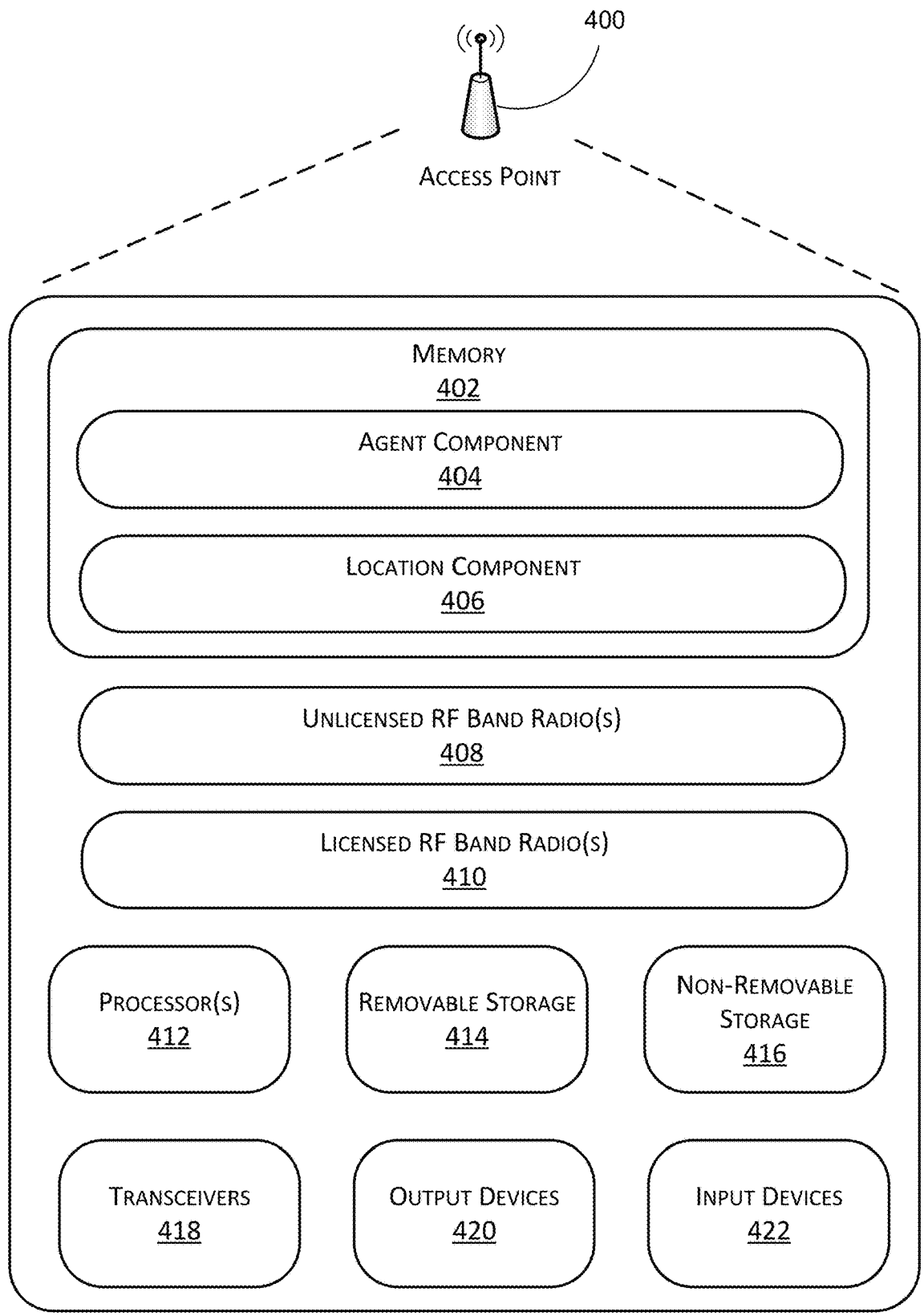
FIG. 4 illustrates a component level view of an example access point to monitor and/or implement a mesh network, in accordance with some examples of the present disclosure.

In some implementations, the processor(s) 312 is a central processing unit (CPU), a graphics processing unit (GPU), or both CPU and GPU, or any other sort of processing unit. The telecommunication network device 300 may also include additional data storage devices (removable and/or non-removable) such as, for example, magnetic disks, optical disks, or tape. Such additional storage is illustrated in FIG. 4 by removable storage 314 and non-removable storage 316.

Non-transitory computer-readable media may include volatile and nonvolatile, removable and non-removable tangible, physical media implemented in technology for storage of information, such as computer readable instructions, data structures, program modules, or other data. System memory 302, removable storage 314, and non-removable storage 316 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the telecommunication network device 300. Any such non-transitory computer-readable media may be part of the telecommunication network device 300.

In some implementations, the transceivers 318 include any sort of transceivers known in the art. For example, the transceivers 318 may include wired communication components, such as an Ethernet port, for communicating with other networked devices. Also or instead, the transceivers 318 may include wireless modem(s) to may facilitate wireless connectivity with other computing devices. Further, the transceivers 318 may include a radio transceiver that performs the function of transmitting and receiving radio frequency communications via an antenna.

In some implementations, the output devices 320 include any sort of output devices known in the art, such as a display (e.g., a liquid crystal display), speakers, a vibrating mechanism, or a tactile feedback mechanism. Output devices 320 also include ports for one or more peripheral devices, such as headphones, peripheral speakers, or a peripheral display.

In various implementations, input devices 322 include any sort of input devices known in the art. For example, input devices 322 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 4 illustrates a component level view of an example access point 400 that may be used to generate conditions data and provide the conditions data to a telecommunication network device. The access point 400 may be an example of access points 102(1)-102(X), access points 202(1)-202(Z), another network device, or any combination thereof. As illustrated, the access point 400 comprises a system memory 402 storing an agent component 404 and a location component 406. Also, the access point 400 can include unlicensed RF band radio(s), licensed RF band radio(s), a processor(s) 412, a removable storage 414, a non-removable storage 416, transceivers 418, output device(s) 420, and input device(s) 422.

In some cases, the agent component 404 may monitor conditions of the access point 400 or other access points, such as access points 102 and 202, and the links, such as links 110 and 210 between the access points that make up the mesh network 112 and 212. For example, the agent component 404 may monitor conditions data, such as weather data, signal level, a signal quality, a packet loss rate, interference, an uplink rate, or a downlink rate, and report the conditions data to the telecommunication network device 300.

In some cases, the location component 406 may monitor the location of the access point 400, other access points, such as access points 102 and 202, or the distance between access points, such as access points 102 and 202. The location component 406 may provide the location information or the distance information to the telecommunication network device 300.

In some cases, the unlicensed RF band radio(s) 408 is configured to transmit and receive via unlicensed RF bands, e.g., Wi-Fi, Bluetooth, etc. In configurations, the licensed RF band radio(s) 408 is configured to transmit and receive via licensed RF bands, e.g., transmit and receive RF signals according to 3GPP protocols, UMTS protocols, LTE protocols, 5G protocols, etc., for communication with components of the network 100 and/or 200.

In some implementations, the processor(s) 412 is a central processing unit (CPU), a graphics processing unit (GPU), or both CPU and GPU, or any other sort of processing unit. The access point 400 may also include additional data storage devices (removable and/or non-removable) such as, for example, magnetic disks, optical disks, or tape. Such additional storage is illustrated in FIG. 4 by removable storage 414 and non-removable storage 416.

Non-transitory computer-readable media may include volatile and nonvolatile, removable and non-removable tangible, physical media implemented in technology for storage of information, such as computer readable instructions, data structures, program modules, or other data. System memory 402, removable storage 414, and non-removable storage 416 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the access point 400. Any such non-transitory computer-readable media may be part of the access point 400.

In some implementations, the transceivers 418 include any sort of transceivers known in the art. For example, the transceivers 418 may include wired communication components, such as an Ethernet port, for communicating with other networked devices. Also or instead, the transceivers 418 may include wireless modem(s) to may facilitate wireless connectivity with other computing devices. Further, the transceivers 418 may include a radio transceiver that performs the function of transmitting and receiving radio frequency communications via an antenna.

In some implementations, the output devices 420 include any sort of output devices known in the art, such as a display (e.g., a liquid crystal display), speakers, a vibrating mechanism, or a tactile feedback mechanism. Output devices 420 also include ports for one or more peripheral devices, such as headphones, peripheral speakers, or a peripheral display.

In various implementations, input devices 422 include any sort of input devices known in the art. For example, input devices 422 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 5:
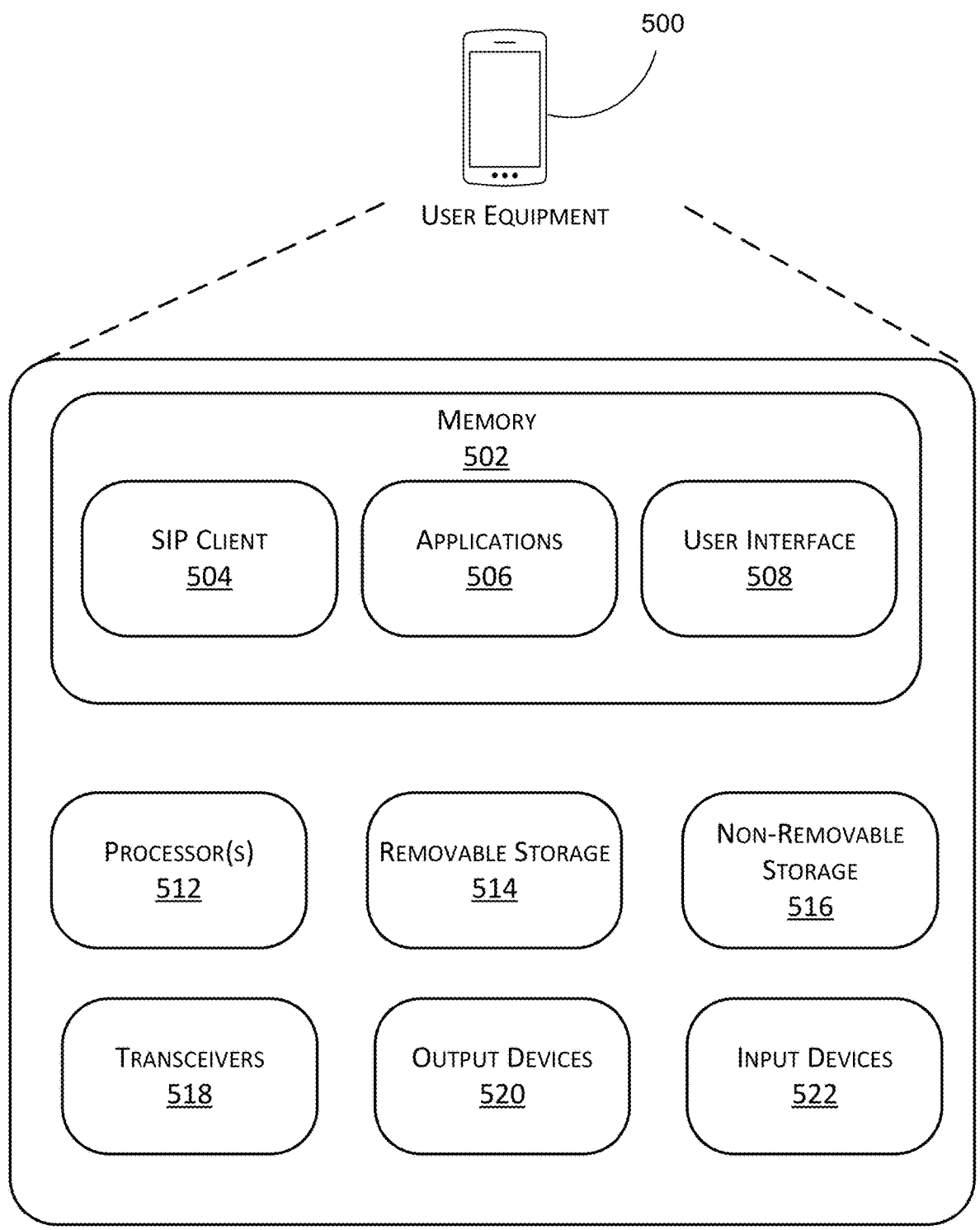
FIG. 5 illustrates a component level view of an example user equipment (UE) in communication with a mesh network, in accordance with some examples of the present disclosure.

FIG. 5 illustrates a component level view of an example UE 500. The UE 500 may be an example of the UE 104 or the UE 204. As illustrated, the UE 500 can comprise a system memory 502 storing a SIP client 504, application(s) 506, a user interface 508. Also, the UE 500 includes processor(s) 512, a removable storage 514, a non-removable storage 516, transceivers 518, output device(s) 520, and input device(s) 522.

In various implementations, system memory 502 is volatile (such as RAM), non-volatile (such as ROM, flash memory, etc.), or some combination of the two. The SIP client 504 may perform any or all of the receiving of network identities, contact addresses, and other functions related to identifying the UE 500 to the network 100. The application(s) 506 can include various common applications (e.g., navigation, text messaging, web browsers, etc.). The UE 500 can also include a user interface 508, such as a graphical user interface (GUI) configured to receive user input and generate user preferences.

In some implementations, the processor(s) 512 is a central processing unit (CPU), a graphics processing unit (GPU), or both CPU and GPU, or any other sort of processing unit. The UE 500 may also include additional data storage devices (removable and/or non-removable) such as, for example, magnetic disks, optical disks, or tape. Such additional storage is illustrated in FIG. 5 by removable storage 514 and non-removable storage 516.

Non-transitory computer-readable media may include volatile and nonvolatile, removable and non-removable tangible, physical media implemented in technology for storage of information, such as computer readable instructions, data structures, program modules, or other data. System memory 502, removable storage 514, and non-removable storage 516 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the UE 500. Any such non-transitory computer-readable media may be part of the UE 500.

In some implementations, the transceivers 518 include any sort of transceivers known in the art. For example, transceivers 518 may include a radio transceiver that performs the function of transmitting and receiving radio frequency communications via an antenna. The transceivers 518 may facilitate wireless connectivity between the UE 500 and other devices. In addition, the transceivers 518 may also include a wireless communication transceiver and a near field antenna for communicating over unlicensed wireless IP networks, such as local wireless data networks and personal area networks (e.g., Bluetooth or near field communication (NFC) networks). Further, the transceivers 518 may include wired communication components, such as an Ethernet port, that connect the UE 500 in a wired fashion to other devices.

In some implementations, the output devices 520 include any sort of output devices known in the art, such as a display (e.g., a liquid crystal display), speakers, a vibrating mechanism, or a tactile feedback mechanism. Output devices 520 also include ports for one or more peripheral devices, such as headphones, peripheral speakers, or a peripheral display.

In various implementations, input devices 522 include any sort of input devices known in the art. For example, input devices 522 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 6:
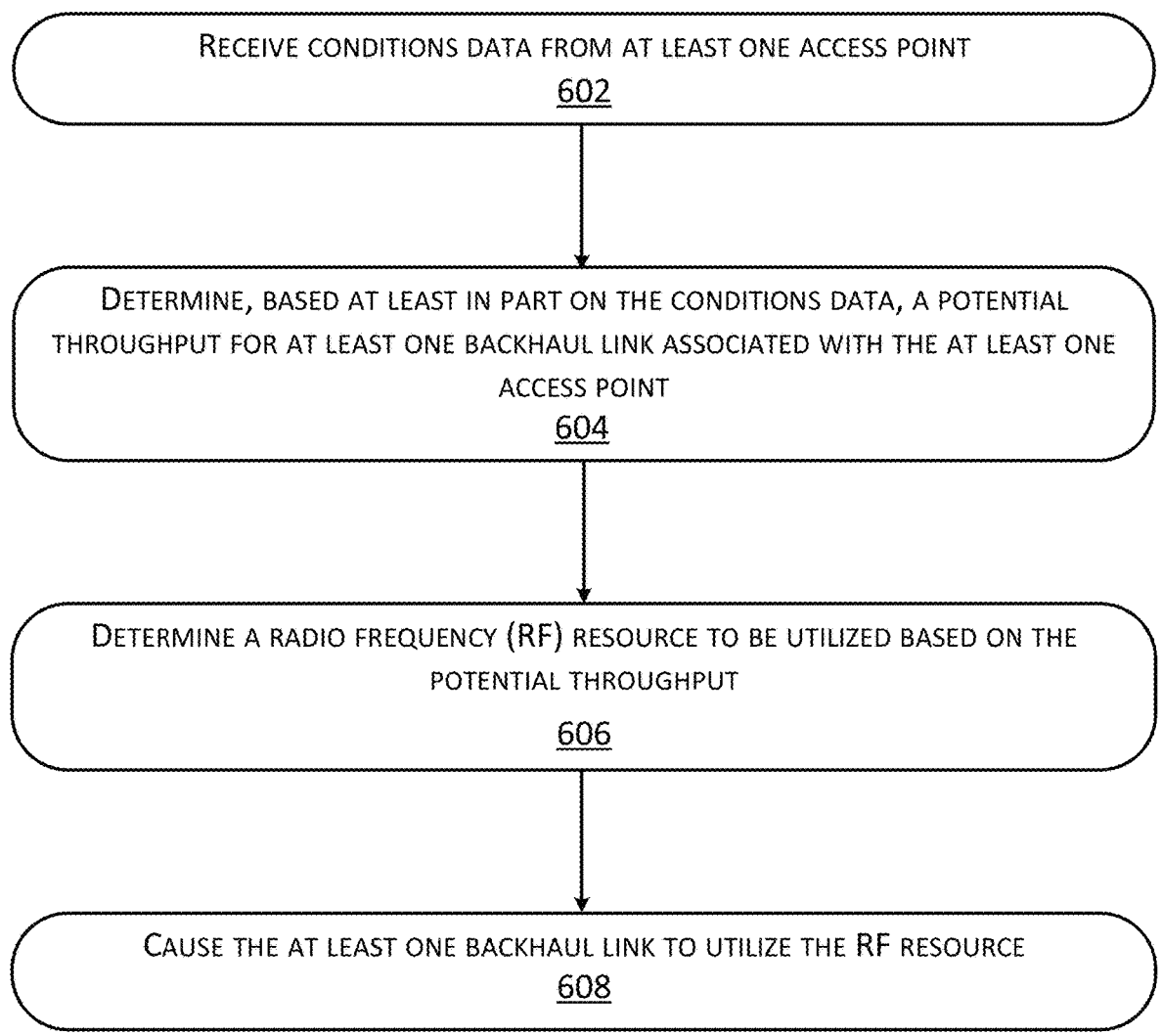
FIG. 6 illustrates an example process for determining a radio frequency (RF) resource to by utilized by a mesh network, in accordance with some examples of the present disclosure.
Figure 7:
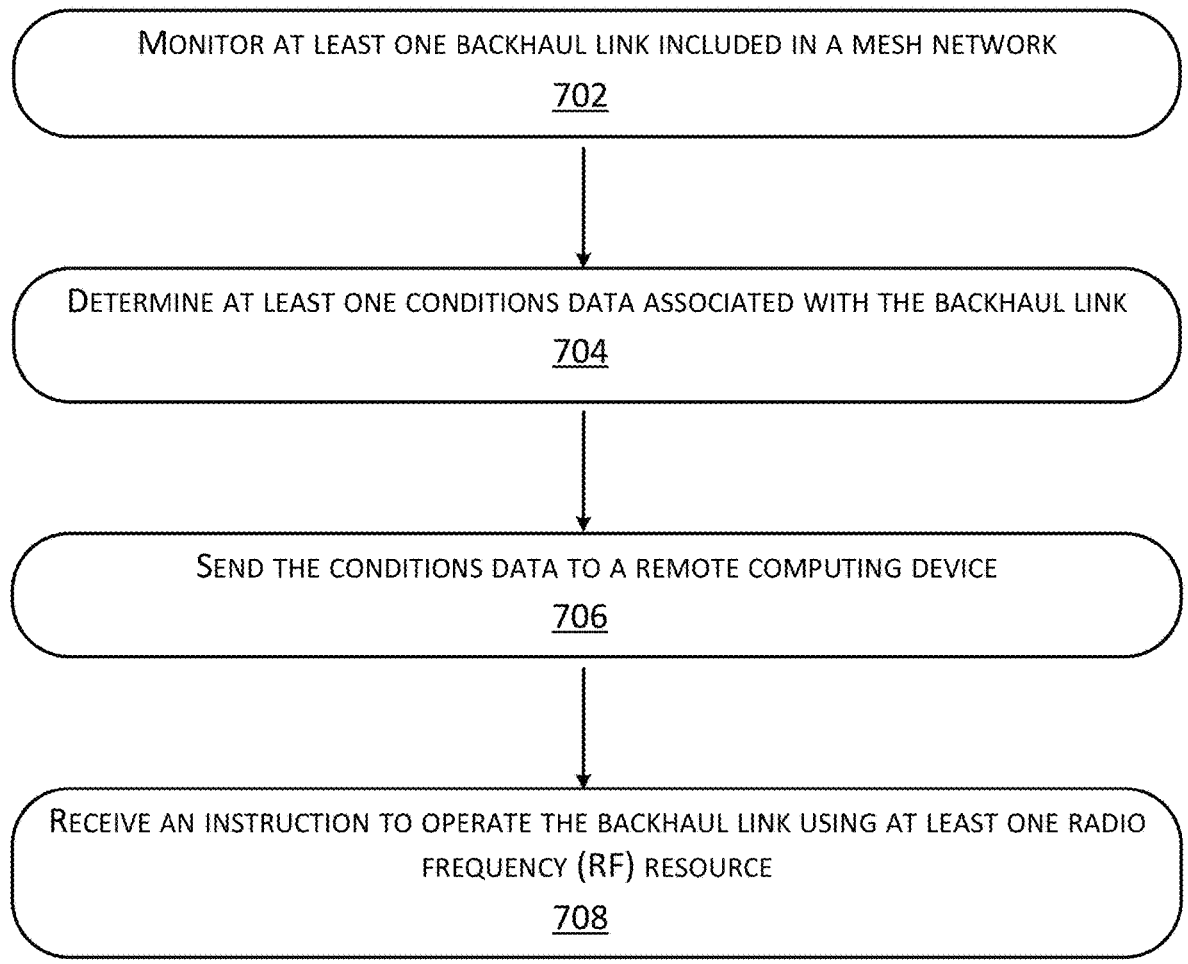
FIG. 7 illustrates an example process for monitoring a mesh network, in accordance with some examples of the present disclosure.

FIGS. 6-7 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described should not be construed as a limitation, and any number of the described operations can be combined in any order and/or in parallel to implement the processes.

As shown in FIG. 6, examples of the present disclosure can also comprise a method 600 for determining a RF resource to be utilized based on a determined potential throughput.

For example, at operation 602, a computing device can receive conditions data from at least one access point. For example, the core network 108 or the base station 214 may include a centralized database that may monitor links 110(1), 110(2), 110(3), 110(Y) used to communicate between the access points 102 that make up a mesh network 112. In some cases, the access points 102 may store an agent that reports conditions data to the centralized database stored at the core network 108. For example, the agent stored at the access point 102 may monitor conditions data, such as weather data, signal level, a signal quality, a packet loss rate, interference, an uplink rate, or a downlink rate, and report the conditions data to the centralized database at the core network 108. In some cases, the conditions data may include a location of the access point 102 or nearby access points 102(1)-102(X) such that the centralized database at the core network 108 may determine a distance between access points 102.

For example, access points 102(1) and 102(3) may have a greater distance between one another and may require a RF with a lower frequency and further range in order to communicate via the link 110(Y) than access points 102(1) and 102(2) that are closer in distance and may communicate using a RF with a greater frequency and shorter range via link 110(1).

In some cases, the centralized database may receive conditions data from a third-party other than the access points 102. For example, the centralized database may receive environmental conditions from a third-party, such as a weather service. In some cases, the conditions data may include self-organized network (SON) data collected by the access points 102.

At operation 604, a computing device can determine, based at least in part on the conditions data, a potential throughput for at least one backhaul link associated with the at least one access point. For example, once the centralized database has received the conditions data, a machine learning algorithm may be utilized to determine a potential throughput for the mesh network 112 and/or an individual access point 102 if a RF resource is utilized for an individual access point 102 or a group of access points 102(1)-102(X) that make up the mesh network 112. For example, the RF resource may be determined based on a determined potential throughput calculated based on the conditions data. In some examples, the machine learning algorithm may include multiple models that may be updated based on historical data.

For example, historical data can include, but is not limited to, conditions data previously observed at various access points, communication resources used by various access points (e.g., wired or wireless resources, radio access technology (e.g., 4G, 5G, Wi-Fi, microwave, and the like), network conditions, measured throughput, and the like. Such historical data and network performance can be used to train one or more machine learning algorithms to optimize a mesh network, as discussed herein.

At operation 606, a computing device can determine a radio frequency (RF) resource to be utilized based on the potential throughput. For example, in some cases, the RF resource may include unlicensed spectrum. For example, unlicensed spectrum may include a number of unlicensed RF bands, such as Wi-Fi, Bluetooth, etc., each of which may have different characteristics that may affect the mesh network in a different way. Similarly, licensed spectrum may include a number of licensed RF bands, such as RF signals according to 3rd Generation Partnership Project (3GPP) protocols, Universal Mobile Telecommunications System (UMTS) protocols, Long Term Evolution (LTE) protocols, Fifth Generation (5G) protocols, etc., that each include different characteristics that affect the mesh network 112 in a different way. Each access points 102(1)-102(X) in the mesh network 112 may support both licensed RF bands and unlicensed RF bands and each access point 102(1)-102(X) may be configured to receive an instruction from the centralized database of the core network 108 to utilize a specific RF band or a combination of multiple RF Bands based on the conditions data that was provided to the centralized database of the core network 108.

At operation 608, a computing device can cause the at least one backhaul link to utilize the RF resource. For example, the backhaul link can include a link between one or more access points of the mesh network. For example, once the machine learning component 310 has determined the RF resource for each access points 102(1)-102(X) and/or 202(1)-202(Z) in the mesh networks 112 and 212 to utilize, the communication component 306 may send a signal to the access points 102(1)-102(X) and/or 202(1)-202(Z) instructing them to communicate using the determined RF resource.

As shown in FIG. 7, examples of the present disclosure can also comprise a method 700 for monitoring a backhaul link and determining conditions data.

For example, at operation 702, a computing device can monitor at least one backhaul link included in a mesh network. For example, a mesh network 112 may include a number of access points 102 that communicate via links 110 that operate using a type of RF signal. The computing device may include one of the access points 102 and may monitor the links 110 and data associated with the links 110.

At operation 704 a computing device can determine at least one conditions data associated with the backhaul link. For example, the access points 102 may store an agent that reports conditions data to the centralized database stored at the core network 108. For example, the agent stored at the access point 102 may monitor conditions data, such as weather data, signal level, a signal quality, a packet loss rate, interference, an uplink rate, or a downlink rate, and report the conditions data to the centralized database at the core network 108. In some cases, the conditions data may include a location of the access point 102 or nearby access points 102(1)-102(X) such that the centralized database at the core network 108 may determine a distance between access points 102. For example, access points 102(1) and 102(3) may have a greater distance between one another and may require a RF with a lower frequency and further range in order to communicate via the link 110(Y) than access points 102(1) and 102(2) that are closer in distance and may communicate using a RF with a greater frequency and shorter range via link 110(1).

At operation 706, a computing device can send conditions data to a remote computing device. For example, once the conditions data are determined the access points 102 may send the conditions data to the centralized data base at core network 108 and/or the base station 214.

At operation 708, a computing device can receive an instruction to operate the backhaul link using at least one radio frequency (RF) resource. For example, the access point 400 may include unlicensed RF band radio(s) 408 configured to transmit and receive via unlicensed RF bands, e.g., Wi-Fi, Bluetooth, etc. In configurations, a licensed RF band radio(s) 408 is configured to transmit and receive via licensed RF bands, e.g., transmit and receive RF signals according to 3GPP protocols, UMTS protocols, LTE protocols, 5G protocols, etc., for communication with components of the network 100 and/or 200. The access point 400 may receive instructions to operate using the unlicensed RF band radios(s) 408, the licensed RF band radio(s) 410, or a combination thereof.

CONCLUSION

While several possible examples are disclosed above, examples of the present disclosure are not so limited. For instance, while various conditions data and RF resources are discussed for use with the system, other conditions data and RF resources can be utilized in a similar fashion. In addition, the location and configuration used for various features of examples of the present disclosure such as, for example, the layout of the networks 100 and 200, for example, can be varied according to a particular network, UE, access point, or location that requires a slight variation due to, for example, size or power constraints, the type of processing required, or regulations related to transmission interference, for example. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A computing device comprising:
   a processor;
   a memory; and
   computer-readable instructions stored on the memory that, when executed by the processor, cause the computing device to perform operations comprising:
   receiving conditions data from at least a first access point;
   determining, based at least in part on the conditions data, a potential throughput for at least one backhaul link connecting the first access point with a second access point;
   determining a radio frequency (RF) resource to be utilized based at least on the potential throughput, on a location of the first access point, and on a location of the second access point; and
   causing the at least one backhaul link to utilize the RF resource,
   wherein the computing device is separate and distinct from the first access point and the second access point.

2. The computing device of claim 1, wherein the RF resource includes at least one of a licensed spectrum or an unlicensed spectrum.

3. The computing device of claim 1, wherein the conditions data includes at least one of a weather data, signal level, a signal quality, a packet loss rate, interference, an uplink rate, or a downlink rate.

4. The computing device of claim 1, wherein the first access point and second access point are access points of a plurality of access points, the plurality of access points comprising a mesh network.

5. The computing device of claim 4, the operations further comprising determining a distance between the first access point and the second access point and wherein the RF resource is determined based at least in part on the distance.

6. The computing device of claim 4, wherein further comprising determining a potential throughput for the mesh network and wherein determining the RF resource is based at least in part on the potential throughput for the mesh network.

7. The computing device of claim 1, wherein at least one of the first access point or the second access point includes at least one of a base station, a Wi-Fi access point, an eNodeB, or a gNodeB.

8. The computing device of claim 1, wherein determining the RF resource is based at least in part on a machine learning algorithm.

9. A method implemented by a computing device of a core network of a telecommunication network, comprising:
   receiving conditions data from a first access point of the telecommunication network;
   determining, based at least in part on the conditions data, a potential throughput for at least one backhaul link connecting the first access point with a second access point of the telecommunication network;
   determining a radio frequency (RF) resource to be utilized based at least on the potential throughput; and
   causing the at least one backhaul link to utilize the RF resource,
   wherein the computing device is separate and distinct from the first access point and the second access point.

10. The method of claim 9, wherein at least one of the first access point or the second access point includes at least one of a base station, a Wi-Fi access point, an eNodeB, or a gNodeB.

11. The method of claim 9, wherein the RF resource includes at least one of a licensed spectrum or an unlicensed spectrum.

12. The method of claim 9, wherein the conditions data includes at least one of a weather data, signal level, a signal quality, a packet loss rate, interference, an uplink rate, or a downlink rate.

13. The method of claim 9, wherein the first access point and second access point are access points of a plurality of access points, the plurality of access points comprising a mesh network.

14. The method of claim 13, further comprising determining a distance between the first access point and the second access point and wherein the RF resource is determined based at least in part on the distance.

15. The method of claim 13, further comprising determining a potential throughput for the mesh network and wherein determining the RF resource is based at least in part on the potential throughput for the mesh network.

16. The method of claim 9, wherein determining the RF resource is based at least in part on a machine learning algorithm.

17. A computing device of a core network of a telecommunication network comprising:
- a processor;
- a memory; and
- computer-readable instructions stored on the memory that, when executed by the processor, cause the computing device to perform operations comprising:
  - receiving conditions data from a first access point of the telecommunication network;
  - determining, based at least in part on the conditions data, a potential throughput for at least one backhaul link connecting the first access point with a second access point of the telecommunication network;
  - determining a radio frequency (RF) resource to be utilized based at least on the potential throughput; and
  - causing the at least one backhaul link to utilize the RF resource,
  - wherein the computing device is separate and distinct from the first access point and the second access point.

18. The computing device of claim 17, wherein the RF resource includes at least one of a licensed spectrum or an unlicensed spectrum.

19. The computing device of claim 17, wherein the conditions data includes at least one of a weather data, signal level, a signal quality, a packet loss rate, interference, an uplink rate, or a downlink rate.

20. The computing device of claim 17, wherein the first access point and second access point are access points of a plurality of access points, the plurality of access points comprising a mesh network.

21. The computing device of claim 20, further comprising determining a distance between the first access point and the second access point and wherein the RF resource is determined based at least in part on the distance.

* * * * *